9331X
I. Orr.
Heating Stove.
Patented Jan. 20, 1836.
Fig. 3.
Fig. 1.
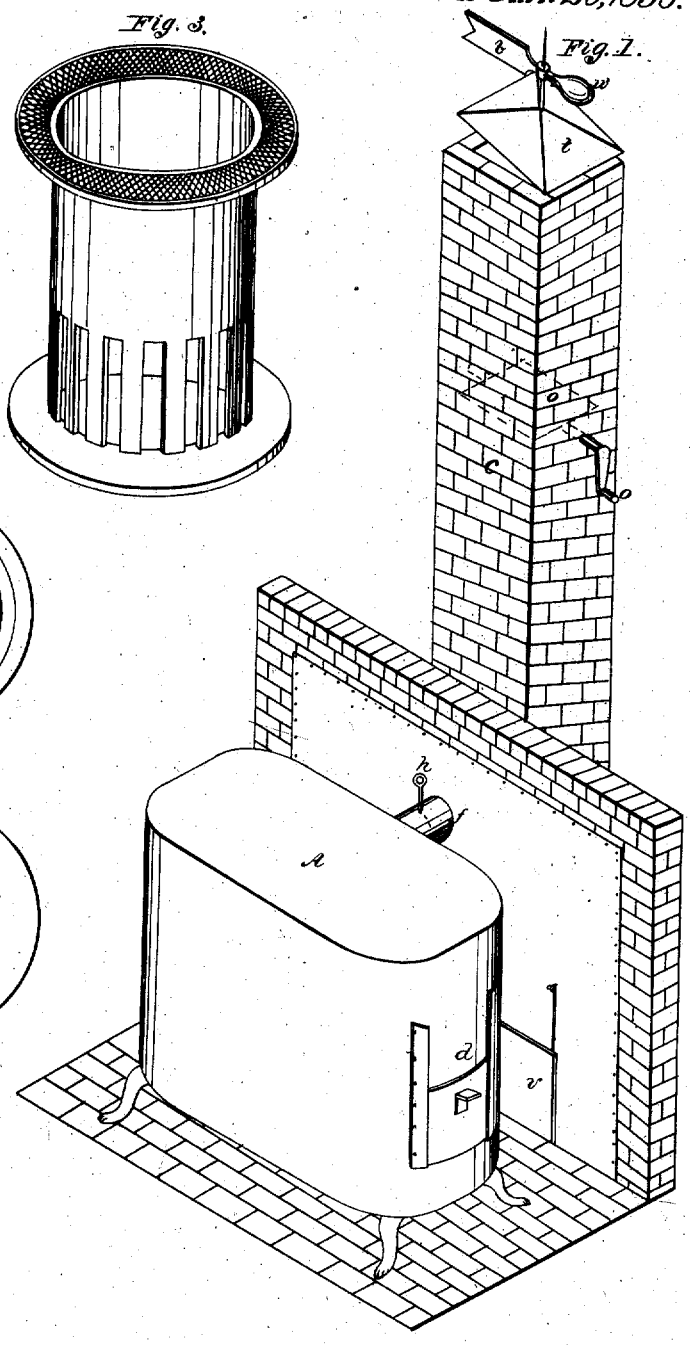
Fig. 2.
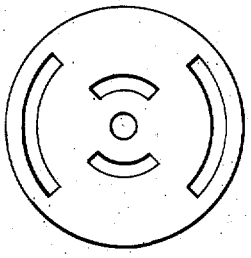
Fig. 2
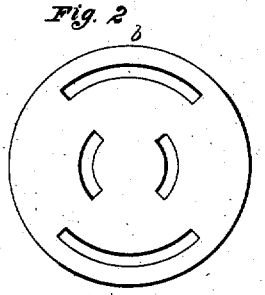

celled. do
Reissue Nov. 12. 1842
No. 6.

Jan. 20, 1836 201.

Isaac Orr of Washington City, D.C.
Letters Patent January 20. 1836. —

The schedule referred to in these Letters Patent and making part of the same containing a description in the words of the said Isaac Orr, himself of his improvement in the air tight stove; and in the management of fuel & heat.

---

To all persons to whom these presents shall come — Isaac Orr citizen of Washington City and District of Columbia sends Greeting — — —
Be it known that I the said Isaac Orr, have invented, executed and applied to use, a new and useful art or method or process, of lessening the consumption and of increasing and otherwise improving the effects of fuel specified in the words following viz. This art or method or process of lessening the consumption and of increasing and otherwise improving the effects of fuel consists in making and keeping the stove or other fire place so nearly air tight at the passages both to and from the fire as to have the combustion of the fuel however dry and combustible, and however great in quantity under the entire, immediate and ready control of the operator, so that he can raise it at once to any required degree of power, put it out or reduce it to any required or useful degree of slow combustion, so that he can by the same means, that is by making and keeping the stove permanently and essentially air tight, and also by giving it the proper size, have any required quantity of fuel ready heated, dried, charred or reduced to charcoal for immediate use, without having separated it at all from the living fire which is to kindle it, or from the current of air passing through the stove; so that he can thus retain the fire merely alive, for a night or more or less, for the purpose of kindling without burying or stopping with ashes, or with any other merely temporary or accidental material, so that he can thus retain the smoke and air in the stove or fire place at pleasure, causing the same air and smoke, to circulate within, ascending from the fire and descending to and through it repeatedly thus consuming their carbon and oxygen and repeatedly receiving caloric from the fire and transmitting it repeatedly through the top and sides of the stove or fire place, which for this purpose should be chiefly or wholly composed of sheet iron or other thin
material, so that he can thus and by means of having the stove made of
greater or less capacity in comparison of the amount of fire, make its heat or
warmth mild or temperate in proportion to the greatness of such capacity or intense
and radiating in proportion to the smallness of such capacity, and so that he can
thus produce a uniformity in the combustion of fuel, and in the communication
of heat, greater than by any stove known with less trouble in the management
and with greater safety when the fire is left to itself. The means by which the
requisite tightness is most simply and readily obtained, is by making the open-
ings to and from the fire, as few and small as is consistent with convenience
and as tight as is requisite to answer the purposes desired the sliding door being
made and used at the entrance or entrances to the fire, both for the purposes
of tightness and of facility safety and exactness in regulating the draft and
closing up the fire though in the process of this specification any other conven-
x ient door may be used. The axis of the damper should be aside from the
centre of the area of the damper for the purpose of giving way readily before
the force of occasional though in no way dangerous explosions occasioned
by hydrogen — When anthracite or other fuel of rather difficult com-
bustion is to be used, the method of making the heat or warmth commu-
nicated from the stove or fire place mild or temperate and of keeping the
fire alive in case of reducing or lowering the degree of combustion is to
put a vessel of cast iron or other material lined or otherwise to contain the
coal or fuel inside of the stove or fire place, and at such a distance
from the sides of the stove or fire place, that the smoke and air may circu-
late freely between said vessel and said sides; said vessel communicating both
at top and bottom by openings, with said air and smoke, which are thus
permitted to pass repeatedly through the fuel in said vessel for the purpo-
ses of consuming their carbon and oxygen; and of repeatedly receiving and
conveying caloric from the fire to the top and sides of the stove or fire-
place, said vessel also being made to communicate at bottom with the air
of the room, through a double wheel grate or through a sliding or other
door and any other grate, by which means in either case the draft may
be stopped increased or otherwise regulated at pleasure — — —

The double wheel grate also serving the purposes of a grate, a poker and a cleaner. The double wheel grate is composed of two similar wheels flat or otherwise through the inverted conical wheels are believed to be the best. The two wheels being made with corresponding openings, which openings may in their length radiate from the centre of each wheel, be made concentric with it or otherwise though the concentric openings are believed to be the best, one of the wheels is to be fixed at or near the bottom of the stove or fire place, and the other wheel is to be made so as to revolve on the inside of the former wheel by means of an axis fixed to the inner wheel said axis passing moveably through the centre of the outer wheel; said wheels to be so constructed that the openings of the outer wheel will be wider than those of the inner so that small bodies passing through the inner wheel will not stick in the openings of the openings of the outer wheel, the openings of the two wheels being made of such form position and comparative sizes, that in one position of the two wheels the openings of one will coincide with the openings of the other, in another position, the openings of one will be closed by the solid parts of the other and in the intervening positions the openings through both wheels will be more or less diminished or enlarged by which diminution or enlargement the draft is regulated - -

In all cases in managing the stove or fire place the damper should be opened only just so much more or less than the door, that smoke from the fire will not come into the room. An excess of opening of the door brings the smoke into the room, an excess of opening of the damper carries off the heat, and wastes the fuel. Successive explosions or puffs may be usually prevented by an excess of opening of the damper in which case only it is believed to be expedient or free from loss. When coal is used a smoke for the requisite trial may be made by a bit of wood or other smoking or odoriferous material - - - - - - - -

2. In making an opening behind or near the bottom of the air tight stove or other air tight fire place, directly from the room into the main flue or chimney, into which main flue the flue of said stove or fire place enters, said opening to be used as a ventilator, for letting the air of the room go off it being hastened by the draft of the main flue or chimney without passing through the stove or fire place, by which means
much heat is saved - With the exception of said opening and the flue of the
stove or fireplace, the separation composed of brick, sheet iron or other
material between the room and the main flue should be entirely air
tight to prevent the escape of the warm air of the room, the pressure of which
against said separation or partition is at times very powerful. Said opening
should be large or small according as the room is to be often or seldom
ventilated; from five to nine inches square is believed to be sufficient, said
opening is closed by a light shutter or cover of wood paste board or other
material, which shutter is made, so as to turn on its lower edge, having an
obstruction (a slender spring is best) which will prevent it from opening too far,
so that the outward pressure of the warm air of the room may close it, or said
shutter may be suspended on hinges or otherwise, being easily movable, and so
constructed that when said shutter hangs freely, it will close the ventilator so
as to be air tight or nearly so, and that when it is pressed inward toward the
room it will easily open, so that when a door of the room is shut quickly, the
ventilator may open more or less, and the smoke may not be drawn by said
door from the stove or fire place into the room, and so that a sudden gust
coming down the main flue or chimney may find a brief and partial en-
trance by the ventilator instead of flowing through the stove or fire place,
thus carrying the smoke with it into the room - When the air of the room
requires to be changed in the day time, when the room should be warm
the fire should be a little increased and the ventilator opened wide for fif-
teen or thirty minutes, more or less - It is usually however quite sufficient
to keep it open during the night when much warmth in the room is not
required, and even then it is usually enough and most useful to open it
partially, more when the weather is warm, less when it is cold - -
If it is desired still further to increase and extend the effect of the fuel,
the chimney or main flue itself may be made of sheet iron or other
thin material having a damper on a level with each of the higher floors
of the house - In this way less room is occupied and the warm air and
smoke being longer detained and circulating in the main flue, the upper
rooms may often be sufficiently warmed by the fire below - In this case there should be a ventilator into the main flue from each of the rooms, which
ventilators should be capable of being rendered completely air tight; air tight
stoves if needed may also be attached to the same main flue in all the
rooms which are above and below each other. — —
For the purpose of increasing the same effect but more especially for pre-
venting the wind from blowing down chimney which is not entirely preven-
ted by the air tight stoves, though it is more so than by any other fire place
the top of the main flue or chimney should be surmounted by a simple
conical pyramidal or other simply formed cap, of sheet iron or other light
material made to move up and down but not to revolve, having a vane con-
nected with it with a weight on the windward end of the vane, and so
constructed that said weight will always bring the windward side of the cap
nearer the top of the main flue, or chimney than the leeward side of the cap.
When the cap turns with the vane, said weight is not used, but the vane and
cap are so constructed that the vane when turned by the wind carries the
lower side of the cap around with it. By means of an apparatus composed
of levers and their connecting wires or rods, somewhat in the manner of
house bells said cap is raised and lowered at will from any required position
so as to open or otherwise regulate the passage of the smoke from the top of the
main flue or close it entirely if desired, in which last case the non revolving
cap is believed to be best, the other the most simple for other purposes — —
What I claim as my own invention or discovery and not previously known
in the above described art, or method or process is. 1. The whole combination
of new and old particulars in the construction manufacture and use of the
whole apparatus above described, and for attaining the objects specified above.
2. The combination of new and old particulars in the construction, manufac-
ture and use of the air tight stove or fire place, as above described, and for
attaining the objects above specified in connexion therewith — — — — —
3. The combination of new and old particulars in the construction manu-
facture and use of the main flue, as above described in connexion with
the cap and ventilators also described and for attaining the objects spe-
4. The combination of new and old particulars in the construction manufacture and use of the ventilators as above described and for attaining the objects specified in connexion therewith —
cified in connexion therewith — 5. The combination of new and old par-
ticulars in the construction, manufacture and use of the smoke cap as above

9331X described and for attaining the object specified in connexion therewith —
6. The new art or process of constructing and using the simple cap having
having nothing between it and the ordinary main flue or chimney so as to
move, up and down or so as to revolve with the vane, having its windward
edge all the time very near to the top of the chimney —
7. The new art or process of constructing and using the ventilator so that it will
communicate directly with the main flue, or chimney giving way before a
slight pressure from without the room and closing before a slight pressure from
within it, as above specified — 8. The new art or process of heating drying or
charring the fuel beforehand in any required quantity without separating it
at all from the fire that is to kindle it, or from the current of air passing through
the fire place, and of retaining the fire merely alive as in the case of raking
it in the manner and for attaining the objects above specified —
9. The new art or process of causing the same air and smoke to circulate in
the stove or fire place, so as repeatedly to pass to and through the fire in the
manner, and for attaining the objects above specified. This may be much
more imperfectly done without the damper the removal of which cannot there-
fore invalidate my claim — 10. The new art or process of obtaining different
kinds of temperature in a room, as it regards the mildness and more exci-
ting radiation of that temperature in the manner, and by the means above
described especially useful for consumptive people —
11. The construction, manufacture and use of the sliding door as the prin-
cipal door or doors of a stove or fire place as above described, and to attain
the objects above specified — 12. The construction manufacture and use
of the Damper, having its axis aside from the centre of its area, as above
described, and for attaining the object above specified — viz. preventing any
unpleasant effect from puffs or explosion —
13. The construction manufacture and use of the double wheel grate as
above described and for attaining the objects above specified —
14. The construction manufacture and uses of the coal burner or inner
vessel for containing the fuel as above described and for attaining the
purposes above specified — 15. The new and peculiar combination of
the new and old particulars in the construction manufacture and use of the particular air tight Stove exhibited in the Drawing and model accom-
panying this Specification — There are other new particulars and new com-
binations which I do not, and do not mean to abandon but to await if ne-
cessary the disicion of those tribunals to whom such questions are to be finally
refered —

Witnesses
Wm. Cooper Jr.
Sam, Stittenius

Isaac Orr

Drawing (2842 words)

Exd
J.H.